United States Patent
Wada et al.

(10) Patent No.: US 10,045,401 B2
(45) Date of Patent: Aug. 7, 2018

(54) HEATER UNIT AND STEERING WHEEL

(71) Applicant: KURABE INDUSTRIAL CO., LTD., Hamamatsu-shi, Shizuoka-ken (JP)

(72) Inventors: Akifumi Wada, Hamamatsu (JP); Masatsugu Saito, Hamamatsu (JP); Yuki Naito, Hamamatsu (JP)

(73) Assignee: KURABE INDUSTRIAL CO., LTD., Hamamatsu-shi, Shizuoka-ken (JP)

( * ) Notice: Subject to any disclaimer, the term of this patent is extended or adjusted under 35 U.S.C. 154(b) by 279 days.

(21) Appl. No.: 14/820,570

(22) Filed: Aug. 7, 2015

(65) Prior Publication Data
US 2017/0036688 A1 Feb. 9, 2017

(51) Int. Cl.
*H05B 3/36* (2006.01)
*B62D 1/06* (2006.01)
*H05B 1/02* (2006.01)

(52) U.S. Cl.
CPC .............. *H05B 3/36* (2013.01); *B62D 1/065* (2013.01); *H05B 1/0236* (2013.01); *H05B 2203/014* (2013.01)

(58) Field of Classification Search
None
See application file for complete search history.

(56) References Cited

U.S. PATENT DOCUMENTS

| 2003/0111454 | A1   | 6/2003 | Ishiyama et al. |              |
|--------------|------|--------|-----------------|--------------|
| 2011/0073582 | A1*  | 3/2011 | Morita          | B62D 1/065   |
|              |      |        |                 | 219/204      |
| 2012/0129623 | A1*  | 5/2012 | Gill            | A63B 53/14   |
|              |      |        |                 | 473/300      |
| 2013/0056455 | A1*  | 3/2013 | Onishi          | B62D 1/065   |
|              |      |        |                 | 219/204      |
| 2013/0186885 | A1   | 7/2013 | Hoffstaedter et al. |          |
| 2015/0122790 | A1*  | 5/2015 | Yamada          | B62D 1/065   |
|              |      |        |                 | 219/204      |

(Continued)

FOREIGN PATENT DOCUMENTS

JP   S62-217592 A   9/1987
JP   S63-126187 A   5/1988

(Continued)

OTHER PUBLICATIONS

International Search Report for PCT/JP2016/070383 dated Aug. 16, 2016.
PCT written opinion dated Aug. 16, 2016.

*Primary Examiner* — Joseph M Pelham
(74) *Attorney, Agent, or Firm* — Yokoi & Co., U.S.A.; Toshiyuki Yokoi

(57) ABSTRACT

The present invention provides a steering wheel and a heater unit used for the steering wheel that does not give discomfort to a user when operating the steering wheel. A heater unit 31 is comprised of a substrate 10 made of a polymeric foam; and a cord-shaped heater 1 arranged on the substrate 10, wherein a thickness of the substrate 10 is thinner at a portion on which the cord-shaped heater 1 is arranged than other area so that the portion is formed along a shape of the cord-shaped heater 1 and the heater unit 31 is flat. A steering wheel, comprised of the above described heater unit; a wheel core material; and a covering material, wherein the heater unit is arranged between the wheel core material and the covering material.

12 Claims, 20 Drawing Sheets

(56) References Cited

U.S. PATENT DOCUMENTS

2015/0336602 A1   11/2015  Saito et al.
2015/0367875 A1*  12/2015  Nonoyama ............ B62D 1/065
                                                                 219/204
2016/0311457 A1*  10/2016  Kato ...................... B62D 1/065

FOREIGN PATENT DOCUMENTS

| JP | H10-284220 A | 10/1998 | | |
| JP | 2002-096740 A | 4/2002 | | |
| JP | 2003-317905 A | 11/2003 | | |
| JP | 2011-121477 A | 6/2011 | | |
| JP | 2011-181316 A | 9/2011 | | |
| JP | 2013-538688 A | 10/2013 | | |
| JP | 2014-143175 A | 8/2014 | | |
| JP | 2014143163 A | * 8/2014 | ............ | B62D 1/065 |
| JP | 2014143175 A | * 8/2014 | ............ | B62D 1/065 |
| WO | 2014/104000 A | 7/2014 | | |

* cited by examiner

HEATER UNIT AND STEERING WHEEL

BACKGROUND OF THE INVENTION

1. Field of the Invention

The present invention relates to a steering wheel used, for example, for an automobile and a boat, and a heater unit used for heating a wheel portion of the steering wheel. In particular, the present invention relates to the heater unit and the steering wheel that does not give discomfort to a user when operating the steering wheel.

2. Description of the Related Art

Conventionally, it is proposed that the heater unit is installed on the wheel portion of the steering wheel to warm hands of a driver in a cold condition. As shown in FIG. 3, a steering wheel 71 includes a wheel portion 72, a spoke portion 73 and a boss portion 74. The wheel portion 72 includes a wheel core material 77 and a covering material 78 formed of a synthetic resin, a textile, a leather or the like. A heater unit 31 is installed between the wheel core material 77 and the covering material 78. The heater unit 31 is connected to a not illustrated lead wire passed through the spoke portion 73 and the boss portion 74 to receive power supply.

As the heater unit installed on the steering wheel, a cord-shaped heater arranged on a substrate in a predetermined pattern shape shown in Patent documents 1 and 2 is known. Here, various foamed resin sheets, foamed rubber sheets, rubber sheets, nonwoven fabrics and woven fabrics are disclosed as the substrate.

[Patent document 1] Japanese Unexamined Patent Application Publication No. 2003-317905: Matsushita Electric Industrial Co., Ltd.

[Patent document 2] Japanese Unexamined Patent Application Publication No. 2011-121477: KURABE INDUSTRIAL CO., LTD.

However, in the conventional heater units such as the above described Patent documents 1 and 2, as shown in FIG. 8, a cord-shaped heater 101 is simply arranged on substrates 110, 110'. Therefore, thickness at a portion on which the cord-shaped heater 101 is arranged is thicker than other area. Consequently, a user feels uneven thickness when gripping the steering wheel and feels uncomfortable when operating the steering wheel.

BRIEF SUMMARY OF THE INVENTION

The present invention provides a steering wheel that does not make the user feel uncomfortable when operating the steering wheel and a heater unit used for the steering wheel.

A heater unit of the present invention is comprised of a substrate made of a polymeric foam; and a cord-shaped heater arranged on the substrate, wherein a thickness of the substrate is thinner at a portion on which the cord-shaped heater is arranged than other area so that the portion is formed along a shape of the cord-shaped heater and the heater unit is flat.

In the above described cord-shaped heater, a heat-fusing portion can be formed on an outermost layer of the cord-shaped heater.

A steering wheel of the present invention is comprised of the above described heater unit; a wheel core material; and a covering material, wherein the heater unit is arranged between the wheel core material and the covering material.

In a method of manufacturing a heater unit of the present invention, the heater unit comprising: a substrate made of a polymeric foam; and a cord-shaped heater, the method comprising the steps of: arranging the cord-shaped heater on the substrate in a predetermined pattern shape; and thermally compressing the substrate by a flat plate, wherein a thickness of the substrate is thinner at a portion on which the cord-shaped heater is arranged than other area so that the portion is formed along a shape of the cord-shaped heater and the heater unit is flat.

By using the present invention, the surface of the cord-shaped heater is flat without forming unevenness. Therefore, a user does not feel discomfort when operating the steering wheel.

DETAILED DESCRIPTION OF THE INVENTION

Hereafter, preferable embodiments of the present invention will be explained with reference to the drawings.

First Embodiment

Figure 5:
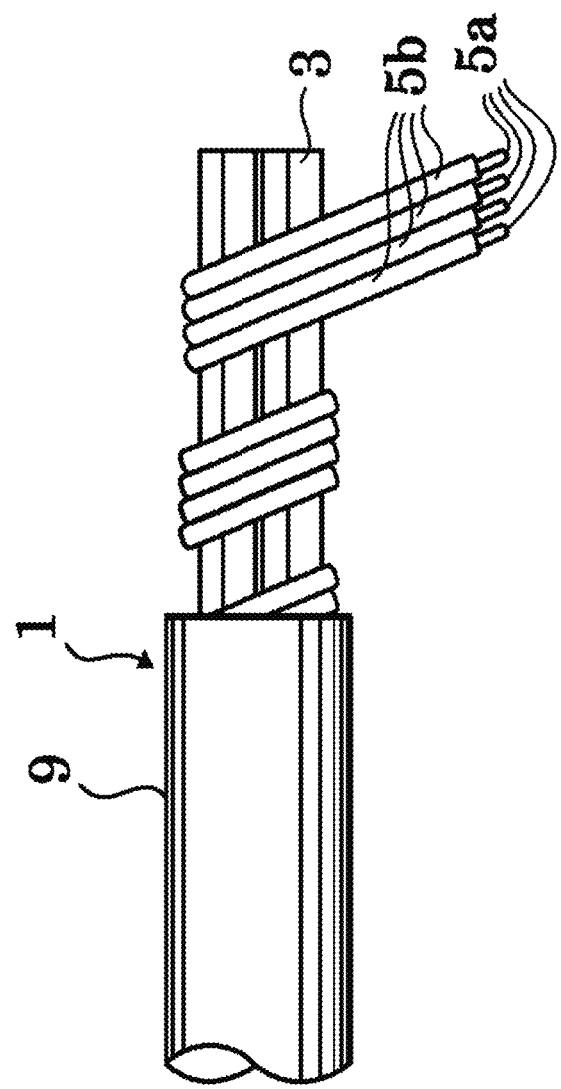
FIG. 5 is a side view showing a configuration of a cord-shaped heater used in the present invention by partly cutting the cord-shaped heater.

At first, a configuration of a cord-shaped heater 1 of the present embodiment will be explained. The cord-shaped heater 1 of the present embodiment has a configuration shown in FIG. 5. A core wire 3 made of a bundle of an aromatic polyamide fiber having an outer diameter of 0.2 mm is provided. Seven conductive wires 5a, which are formed of a tin-containing hard copper alloy wire having a strand diameter of 0.08 mm, are spirally wound at a pitch of about 1.00 mm around an outer periphery of the core wire 3 in a state of being paralleled together. Thus, the cord-shaped heater 1 is configured. Note that an insulating film 5b made of a polyurethane is covered on the conductive wires 5a with a thickness of approximately 0.005 mm. As a heat-fusing portion 9, a polyethylene resin containing a flame retardant is extrusion-covered with a thickness of 0.25 mm on an outer periphery of the wound conductive wires 5a. The cord-shaped heater 1 has a configuration described above and has a finished outer diameter of 0.9 mm.

Next, a configuration of a substrate 10 on which the above described cord-shaped heater 1 is arranged will be explained. The substrate 10 of the first embodiment is formed of a foamed polyurethane resin having an apparent density of 0.04 g/cm$^3$ (in accordance with HS K7222), a hardness of 220 N (in accordance with JIS K6400-2), and a thickness of 8 mm.

Figure 6:
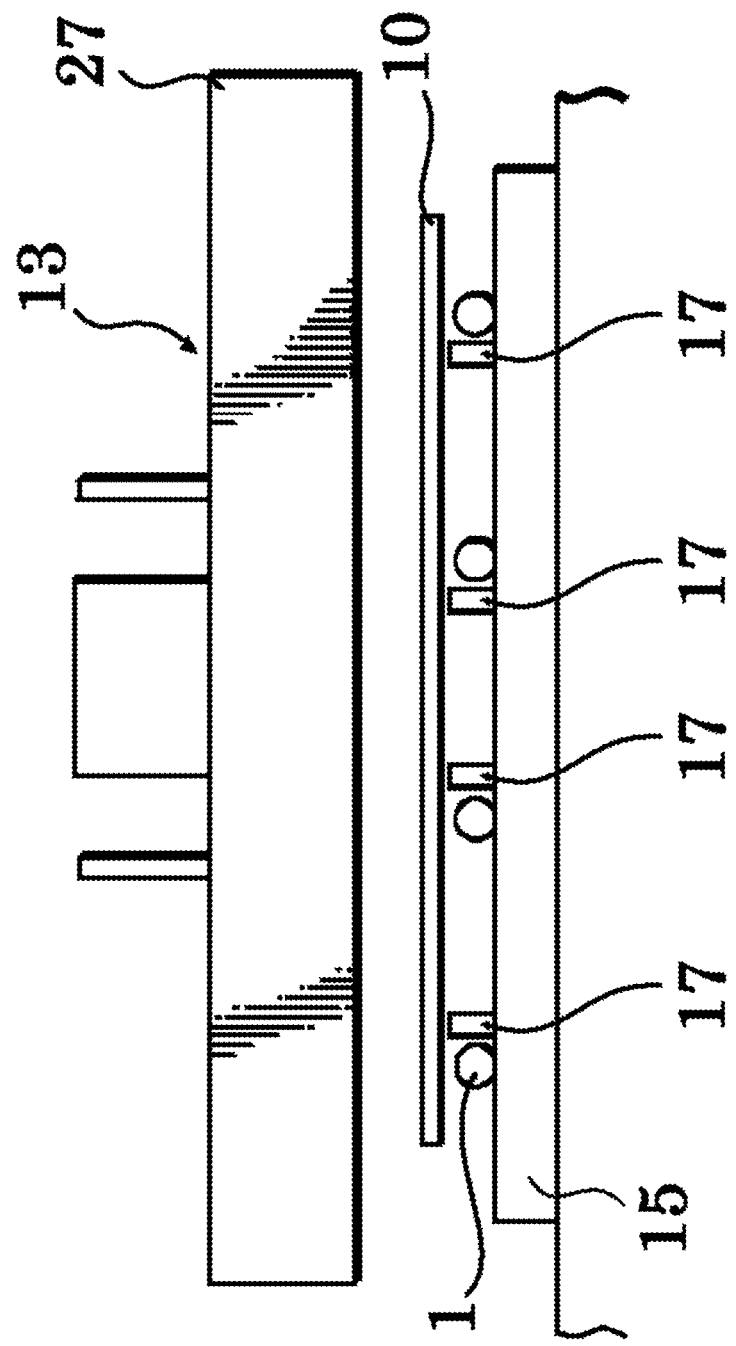
FIG. 6 is a drawing showing a configuration of a hot press-type heater manufacturing apparatus used in the present invention.
Figure 7:
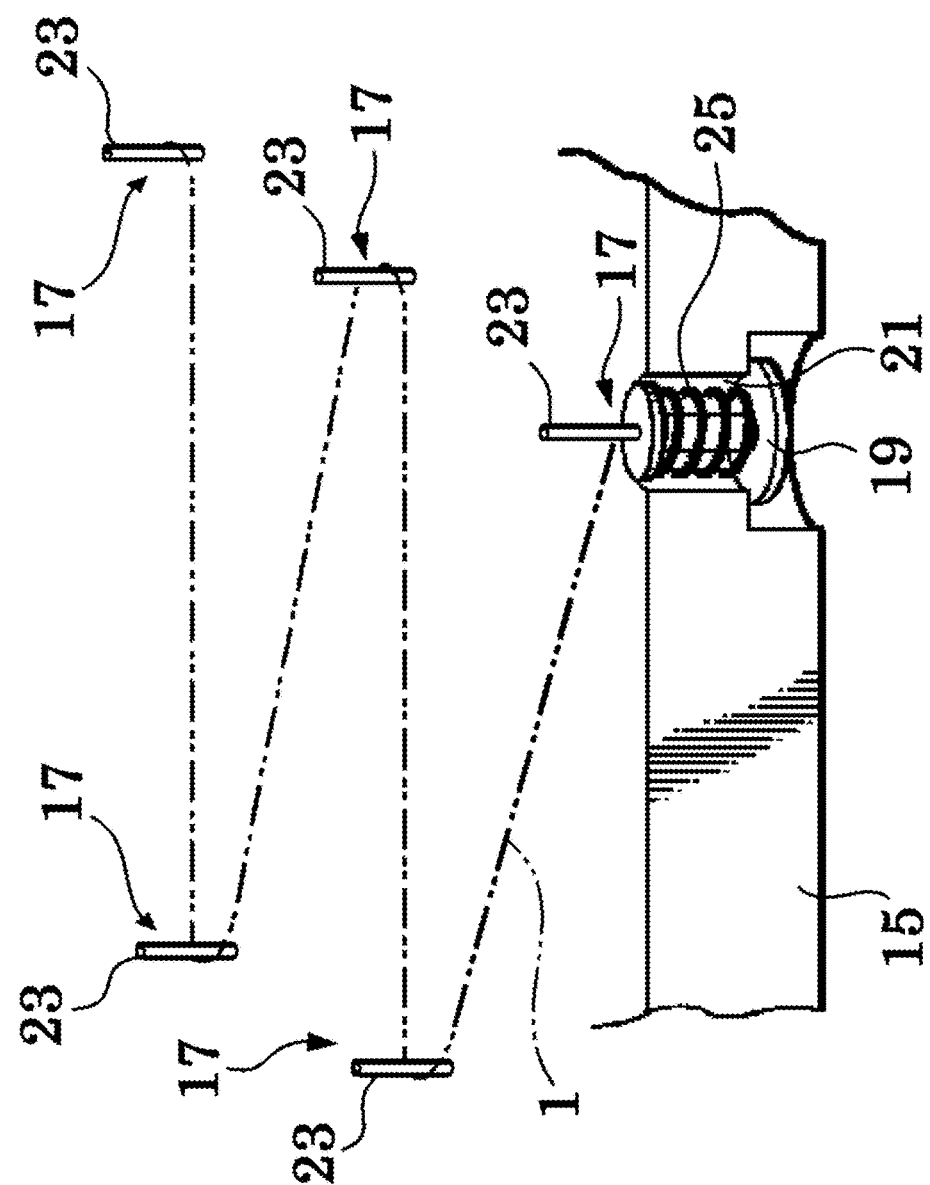
FIG. 7 is a partial perspective view showing a state that the cord-shaped heater is arranged in a predetermined pattern shape in the heater unit of the present invention.
Figure 8:
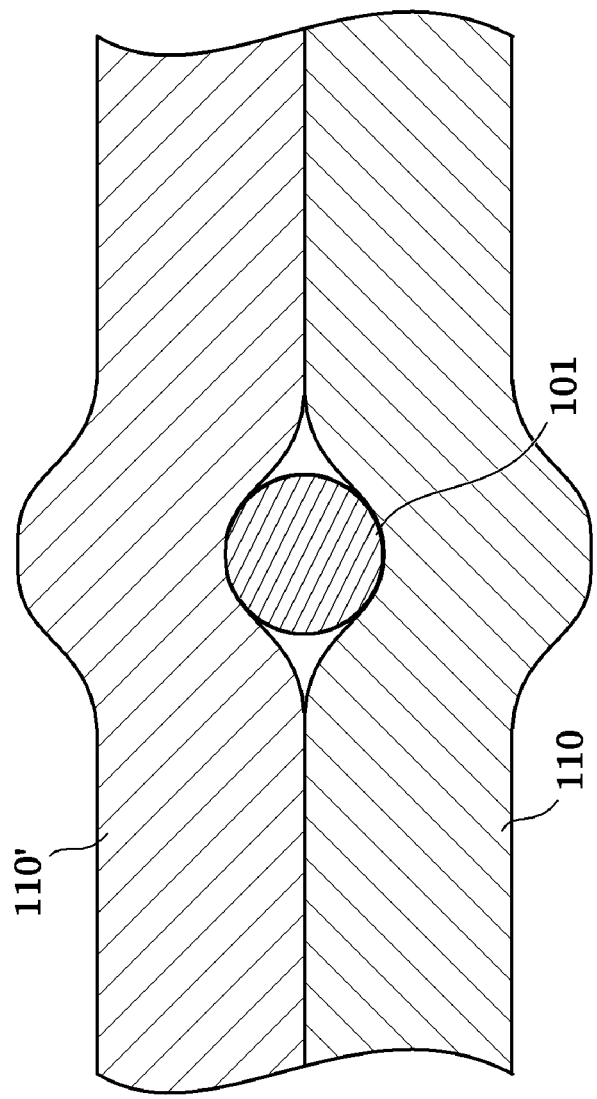
FIG. 8 is a cross-sectional view showing a principal part of the conventional heater unit in an enlarged state.

Next, a configuration of arranging the cord-shaped heater 1 on the substrate 10 in a predetermined pattern shape and then adhering and fixing them with each other will be explained. FIG. 6 is a drawing showing a configuration of a hot press-type heater manufacturing apparatus 13 used for thermally compressing the substrate on which the cord-shaped heater 1 is arranged. A hot pressing jig 15 is prepared and a plurality of hooking mechanisms 17 is provided on the hot pressing jig 15. As shown in FIG. 7, the hooking mechanisms 17 have pins 19. The pins 19 are inserted from below into holes 21 bored on the hot pressing jig 15. Hooking members 23 are mounted on an upper part of the pins 19 movably in an axial direction. Tips of the hooking portions 23 are needle-shaped. The hooking members 23 are always biased upward by coil springs 25. As shown by a virtual line in FIG. 7, the cord-shaped heater 1 is arranged on one side of the substrate 10 in a predetermined pattern shape by hooking the cord-shaped heater 1 on a plurality of the hooking members 23 of the hooking mechanisms 17.

As shown in FIG. 6, a press hot plate 27 is arranged capable of being raised and lowered above the plurality of the hooking mechanisms 17. In other words, the cord-shaped heater 1 is arranged in a predetermined pattern shape by hooking the cord-shaped heater 1 on a plurality of the hooking members 23 of the hooking mechanisms 17, and then the substrate 10 is placed on that. In that state, the press hot plate 27 is lowered so as to thermally compress the cord-shaped heater 1 and the substrate 10. The hot press plate 27 should be designed to be capable of compressing the substrate 10 more than an outer diameter of the cord-shaped heater 1. Thus, the substrate 10 is compressed and fused to a heat-fusing layer 9 of the cord-shaped heater 1. As a result, the cord-shaped heater 1 and the substrate 10 are adhered and fixed. Note that, when the press hot plate 27 is lowered for the thermal compression, a plurality of the hooking members 23 of the hooking mechanisms 17 is moved downward against the biasing force of the coil springs 25. After that, in the present embodiment, the substrate 10 is turned over to thermally compress the substrate 10 again from a surface on which the cord-shaped heater 1 is arranged.

Figure 1:
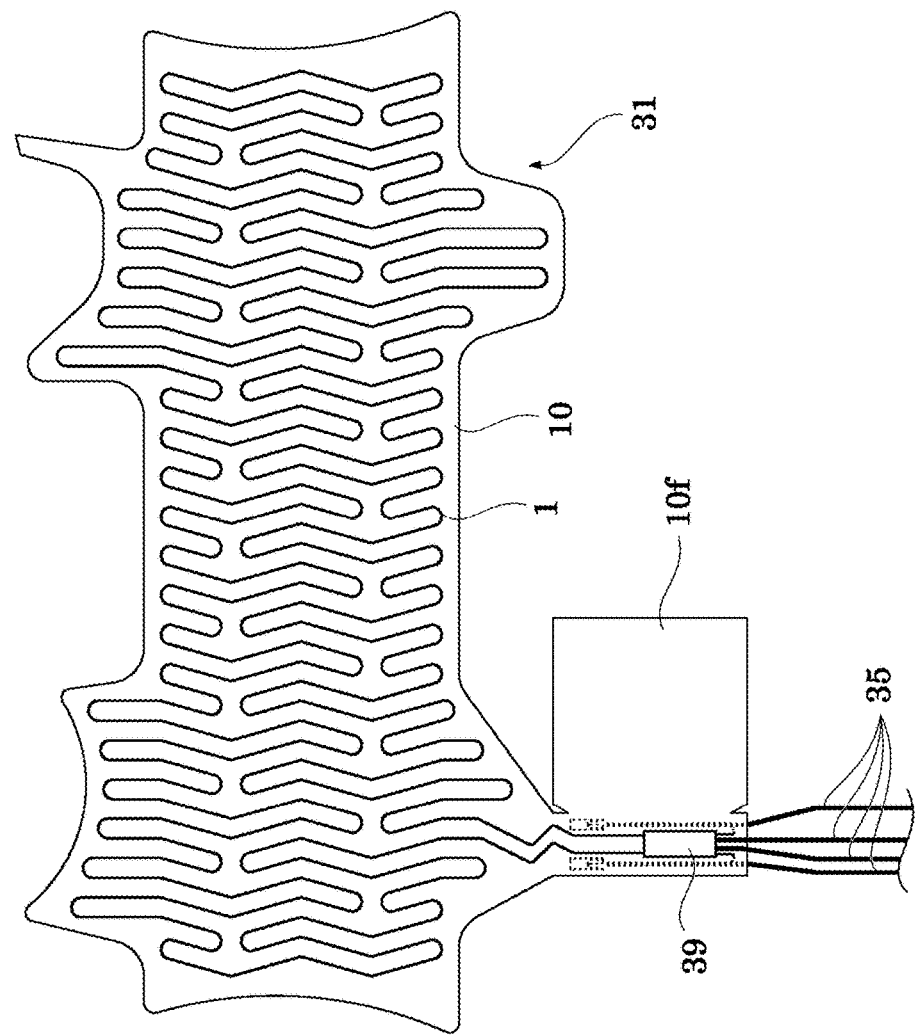
FIG. 1 is a plan view showing a configuration of a heater unit concerning the present invention.
Figure 2:
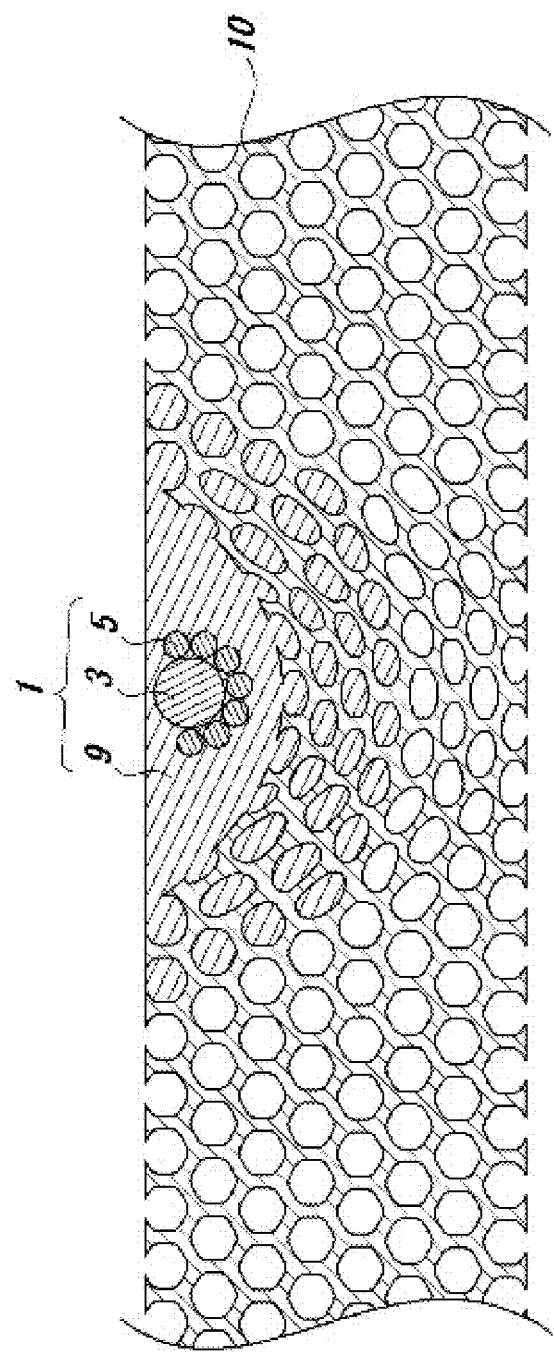
FIG. 2 is a cross-sectional view showing a principal part of the heater unit concerning the present invention in an enlarged state.
Figure 9:
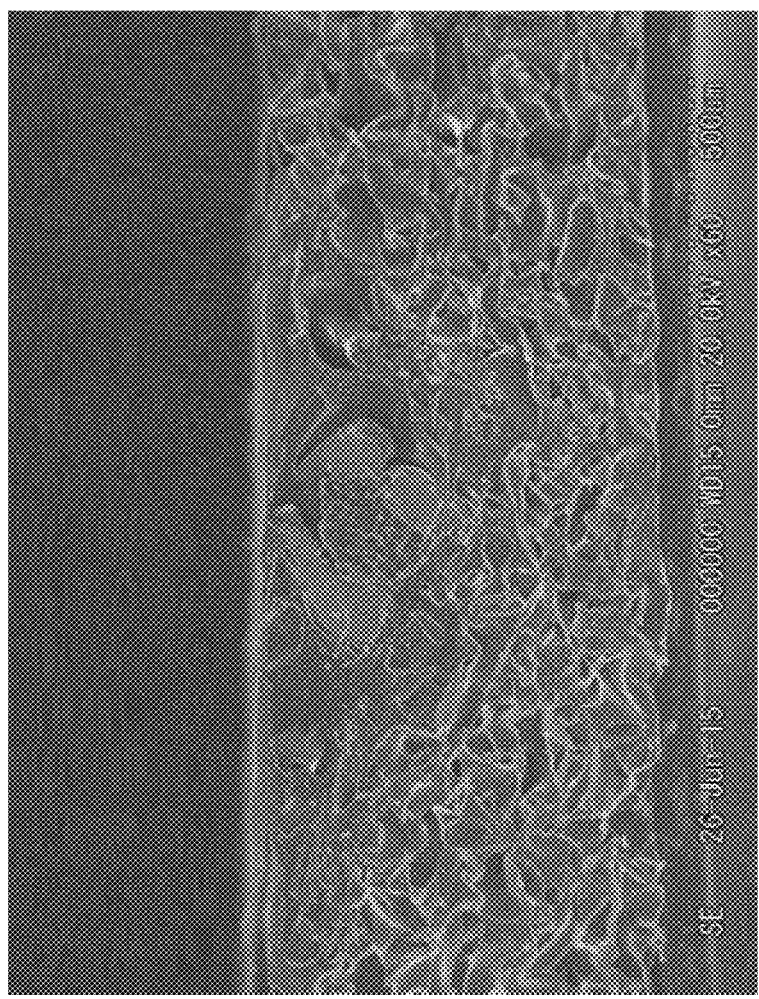
FIG. 9 is an SEM image of a principal part of the cross-sectional view of the heater unit of the first embodiment.

By the above described procedures, the heater unit 31 for the steering wheel shown in FIGS. 1 and 2 was obtained. Note that FIG. 2 is a cross-sectional view showing a principal part of FIG. 1 in an enlarged state. Since the substrate 10 is compressed by a flat plate-shaped hot press plate 27, the pressure to be applied is stronger at the portion on which the cord-shaped heater 1 is arranged than other area. Therefore, a thickness of the substrate 10 is thinner at the portion on which the cord-shaped heater 1 is arranged than other area so that the portion is formed along a shape of the cord-shaped heater 1. In addition, the heat-fusing layer 9 of the cord-shaped heater 1 is largely deformed by the thermal compression. Thus, a thickness of the heat-fusing layer 9 is thinner at a portion with which the substrate 10 is not contacted than other area, and the cord-shaped heater 1 becomes wide and flat-like shape. As explained above, the heater unit 31 becomes flat without forming unevenness even at the portion on which the cord-shaped heater 1 is arranged. In addition, the flat shape is maintained because of a shape retaining effect of the heat-fusing layer 9. Since the substrate 10 is compressed and higher in density in the heater unit 31 obtained by the above explained procedures, mechanical strength can be improved. Note that a thickness of the heater unit obtained by the above explained procedures is 1.00 mm, the minimum thickness of the substrate 10 at the portion on which the cord-shaped heater 1 is arranged is 0.52 mm, and a thickness of the substrate 10 at the portion on which the cord-shaped heater 1 is not arranged is 1.00 mm. FIG. 9 shows an SEM image of a principal part of the cross-sectional view of the heater unit 31. The heat-fusing layer 9 of the cord-shaped heater 1 is impregnated in the substrate 10 up to approximately 0.5 mm from a surface of the substrate 10.

Concerning the heater unit 31 obtained by the embodiment described above, both ends of the cord-shaped heater 1 are drawn out to be connected with a lead wire 35. The cord-shaped heater 1, a temperature controller 39 and a not illustrated connector are connected with each other by the lead wire 35. The temperature controller is arranged on the cord-shaped heater 1 to perform temperature control of the heater unit using heat generated in the cord-shaped heater 1. A projecting portion 10f can be formed on the substrate 10. For the purpose of protecting a connecting portion of the temperature controller 39, the cord-shaped heater 1 and the lead wire 35 from damage, the connecting portion can be covered with the projecting portion 10f of the substrate. From this point of view, the thermal compression can be avoided at the projecting portion 10f. The cord-shaped heater 1 is connected to a not illustrated electric system of the vehicle via the above described connector. The heater unit 31 configured as described above is arranged between the wheel core material 77 of the steering wheel 71 and the covering material 78 in a state shown in FIG. 3.

Figure 3:
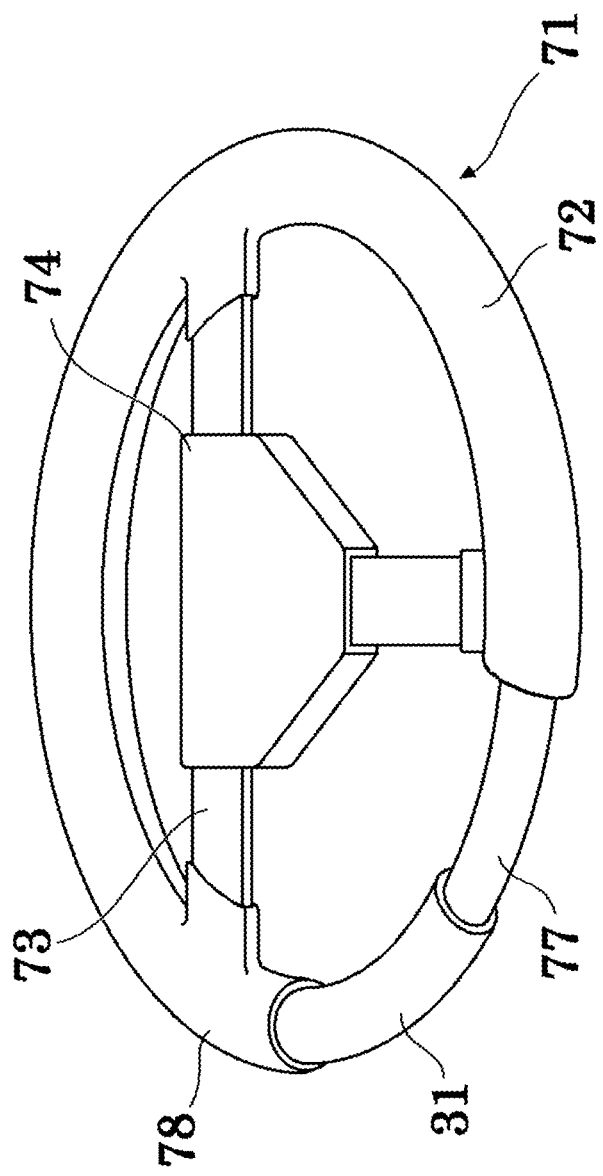
FIG. 3 is a perspective view showing a state that the heater unit of the present invention is embedded in a steering wheel by partially cutting the steering wheel.

Not illustrated adhesive layer is formed on the substrate 10 so as to adhere the heater unit 31 with the covering material 78 of the steering wheel. It is preferred that the adhesive layer is formed by preliminarily forming an adhesive layer only made of an adhesive material on a release sheet and then transferring the adhesive layer from the release sheet to a surface of the substrate 10. By doing so, the adhesive material is prevented from entering into the substrate 10, and the adhesive layer is formed only at the surface of the substrate 10. In the embodiment of FIG. 3, when adhering the heater unit 31 with the covering material 78, the covering material 78 is preferred to be adhered to a side on which the cord-shaped heater 1 is not arranged rather than being adhered to a side on which the cord-shaped heater 1 is arranged. By doing so, the unevenness of the cord-shaped heater 1 hardly appears to the surface of the covering material 78.

The heater unit 31 obtained by the above explained procedures was installed on the steering wheel as shown in FIG. 3 and actually used to confirm the unevenness. Ten users gripped the steering wheel and performed steering operations ten times each in the right and left directions. After that, the users were asked whether or not the unevenness of the cord-shaped heater 1 was felt. As a result, no user answered to feel the unevenness about the steering wheel of the embodiment.

Second Embodiment

A foamed body formed of a foamed polyurethane resin having an apparent density of 0.04 g/cm$^3$ (in accordance with JIS K7222), a hardness of 220 N (in accordance with JIS K6400-2), and a thickness of 6 mm is used as the substrate 10, and the code-shaped heater is arranged same as the first embodiment. Thus, the heater unit shown in FIGS. 1 and 2 is obtained. At this time, the substrate 10 is thermally compressed until a thickness of the substrate becomes 1 mm. After the substrate 10 is thermally compressed, the apparent density is 0.32 g/cm$^3$ (in accordance with JIS K7222).

Third Embodiment

Figure 10:
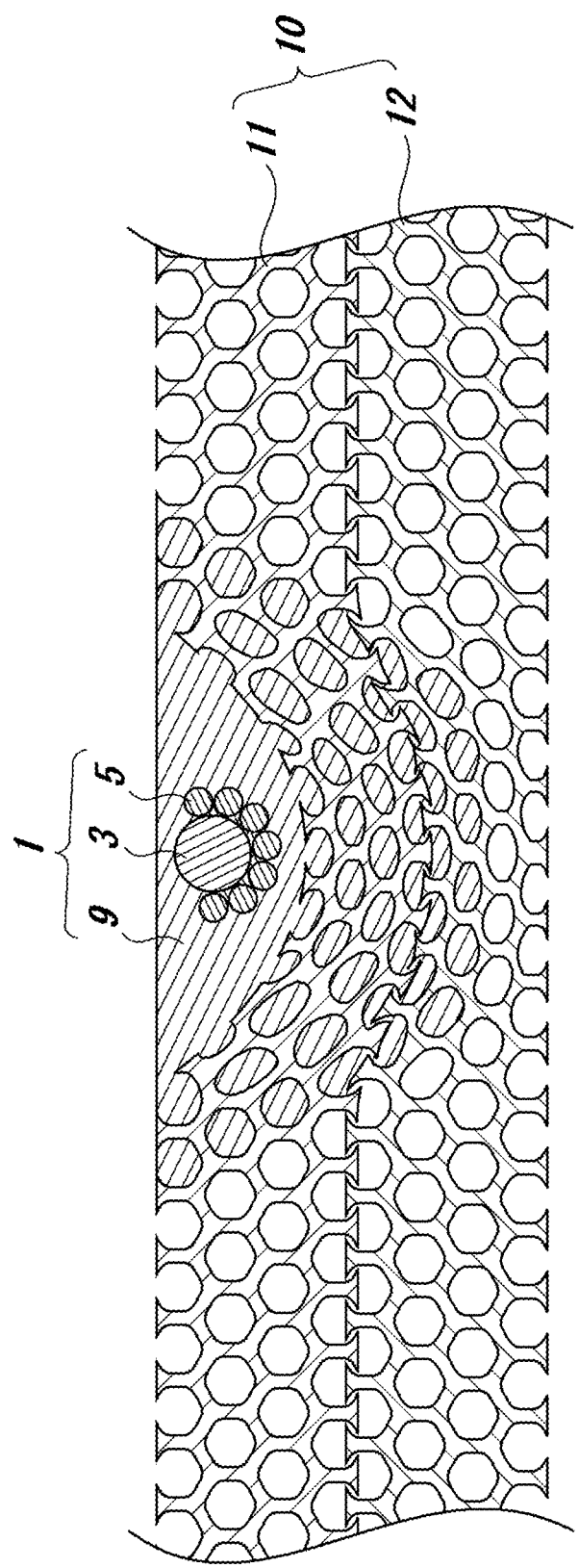
FIG. 10 is a cross-sectional view showing a principal part of the heater unit of the third embodiment.

Two formed bodies formed of a foamed polyurethane resin having an apparent density of 0.04 g/cm$^3$ (in accordance with JIS K7222), a hardness of 220 N (in accordance with JIS K6400-2), and a thickness of 4 mm are used by being laminated together as the substrate 10, and the code-shaped heater is arranged same as the other embodiments. Thus, the heater unit 31 for the steering wheel shown in FIG. 1 and FIG. 10 is obtained. Note that FIG. 10 is a cross-sectional view showing a principal part of FIG. 1 in an enlarged state. At this time, the substrate 10 is thermally compressed until a thickness of the substrate 10 becomes 1 mm. After the substrate 10 is thermally compressed, the apparent density is 0.32 g/cm$^3$ (in accordance with JIS K7222). In the third embodiment, for convenience of explanation, the foamed body arranged on a side of the cord-shaped heater 1 is referred to as a first foamed body 11, and a foamed body of the opposite side is referred to as a second foamed body 12.

At this time, if the heat-fusing layer 9 is configured to be impregnated both in the first foamed body 11 and the second foamed body 12, the first foamed body 11 and the second foamed body 12 are strongly adhered with each other. Thus, the first foamed body 11 and the second foamed body 12 are prevented from being separated from each other.

When the cord-shaped heater 1 is heat-fused, if the first foamed body 11 and the second foamed body 12 are thermally compressed sufficiently so that they are highly compressed, the first foamed body 11 and the second foamed body 12 can be fixed together without using the adhesive layer even at a portion on which the cord-shaped heater 1 is not arranged. This is because non-pore portions of one formed body are entered into pore portions of another formed body, thus two formed bodies are fixed by anchor effect. A peeling strength of the substrate 10, which is obtained by laminating two formed bodies as described above, was measured. The peeling strength was measured by a push-pull gauge. The substrate 10 was cut into a size of 25 mm×150 mm, a longitudinal end was preliminarily peeled off by 50 mm, an end portion of the first formed body 11 was fixed to the push-pull gauge, and an end portion of the second foamed body 12 was held and pulled in an opposite direction of the push-pull gauge (peeling angle: 180°) at a speed of 10 mm/s. Thus, the maximum load was measured as the peeling strength. As for the heater unit 31 of the third embodiment, the peeling strength between the first formed body 11 and the second foamed body 12 measured as described above was 6.2 N. This is a sufficient value for practical use. It was also confirmed that the peeling off was caused by material destruction, not by interfacial peeling. Also from this point of view, it was confirmed that sufficient adhesion strength was obtained. As a reference, the peeling strength was measured by using a sample in which the first formed body 11 and the second foamed body 12 were adhered with each other by a double-sided adhesive tape. The peeling strength was 13.7 N. The peeling strength was also measured by using another example in which the first formed body 11 and the second foamed body 12 were adhered with each other by thermally compressing them without using the cord-shaped heater so that they were highly compressed same as the third example. The peeling strength was 5.0 N and the interfacial peeling occurred.

In the normal substrate 10 formed by one formed body, if by any chance the foamed body is cracked or ripped, the crack or the rip is enlarged and the substrate 10 is disrupted. When the substrate formed by laminating a plurality of formed bodies is used, even if one of the foamed bodies is cracked or ripped, the crack or the rip is limited in one of the foamed bodies and other formed bodies are not influenced. Therefore, the substrate 10 as a whole is prevented from being disrupted.

In addition, if the substrate 10 is formed by laminating the first foamed body 11 and the second foamed body 12, two kinds of foamed body having different properties can be used. Thus, the substrate can include a multiple property. For example, following variations can be considered. A foamed body having high porosity can be selected for one of the formed bodies. If the foamed body having high porosity is used for the side on which the cord-shaped heater 1 is arranged, the cord-shaped heater 1 is more surely entered into the foamed body. Thus, a flat heater unit 31 can be obtained. Alternatively, it is considered that the foamed body having high porosity is used for the side on which the cord-shaped heater 1 is not arranged and another kind of resin is melted and filled to form a composite material. The steering wheel in which heater unit 31 is embedded can be obtained by adhering the heater unit 31 on the wheel core material 77 and then injection molding a urethane resin or the like on that. Here, if the foamed body having high porosity is used for the side on which the cord-shaped heater 1 is not arranged, the injection molded urethane resin or the like is filled in the pores of the foamed body and the heater unit 31 is surely fixed. If the formed bodies having different hardness are laminated, a user hardly feels the presence of the cord-shaped heater 1 when the user touches a product in which the heater unit 31 is installed. By combining various foamed bodies such as a foamed body having excellent flame retardancy, a foamed body having high tensile strength, a foamed body having excellent chemical resistance, a foamed body having excellent heat resistance, a foamed body having excellent voltage resistance, a foamed body having electromagnetic wave shielding property, a foamed body having low repulsive property, a foamed body having low-temperature brittleness and a foamed body having high thermal conductivity, additional functions can be added to the heater unit 31. If thin foamed bodies are laminated, a process of attaching other foamed bodies can be added after the cord-shaped heater is arranged on the thin foamed bodies by heat fusion. Thus, defective fusion caused by an influence of heat insulation of the foamed body can be prevented. In addition, a multilayer structure can be used by laminating other foamed bodies such as a third formed body. In such a case, the heat-fusing layer 9 is preferred to be impregnated in pores of all foamed bodies.

Figure 11:
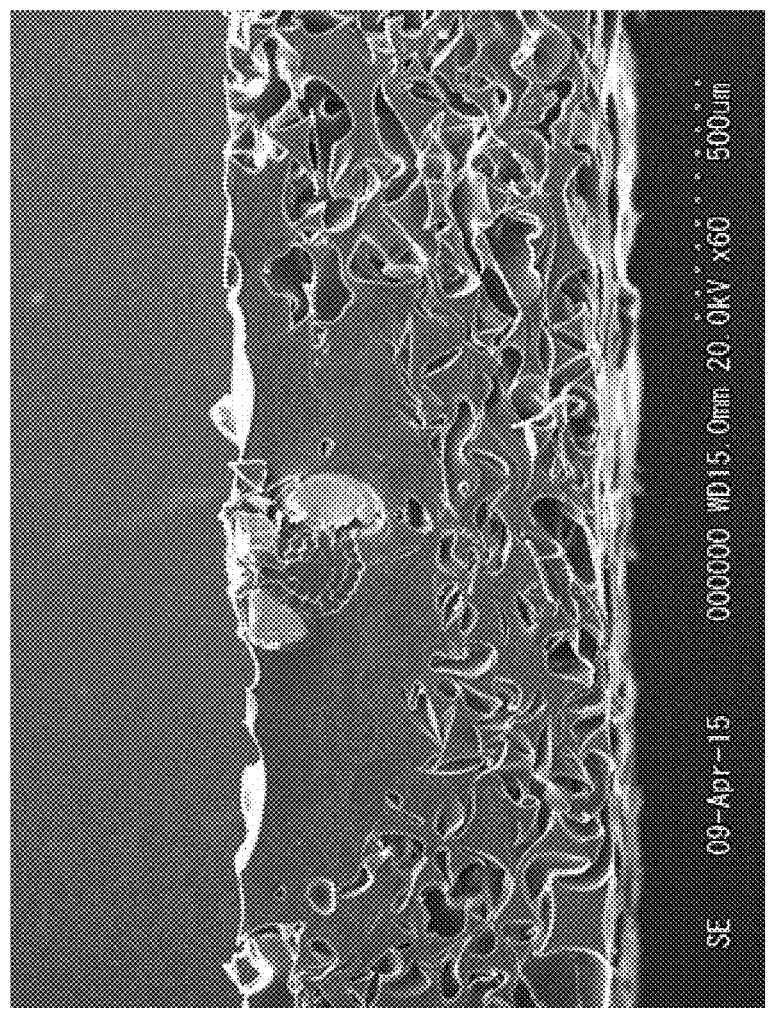
FIG. 11 is an SEM image of a principal part of the cross-sectional view of the heater unit of the third embodiment.

FIG. 11 shows an SEM image of a principal part of the cross-sectional view of the heater unit 31 of the third embodiment. In the figure, it is confirmed that the heat-fusing layer 9 is impregnated in the pores of the first foamed body 11 and the second foamed body 12. In addition, non-pore portions of the second foamed body 12 are entered into pore portions of the first foamed body 11, and non-pore portions of the first foamed body 11 are entered into pore portions of the second foamed body 12. Thus, it is confirmed that the first foamed body 11 and the second foamed body 12 are fixed with each other by anchor effect. The heat-fusing layer 9 of the cord-shaped heater 1 is impregnated in the substrate 10 up to approximately 5 mm from a surface of the substrate 10.

Fourth, Fifth and Sixth Embodiments

Next, the fourth, fifth and sixth embodiments will be explained with reference to FIGS. 12A to 14C.

Figure 12A:
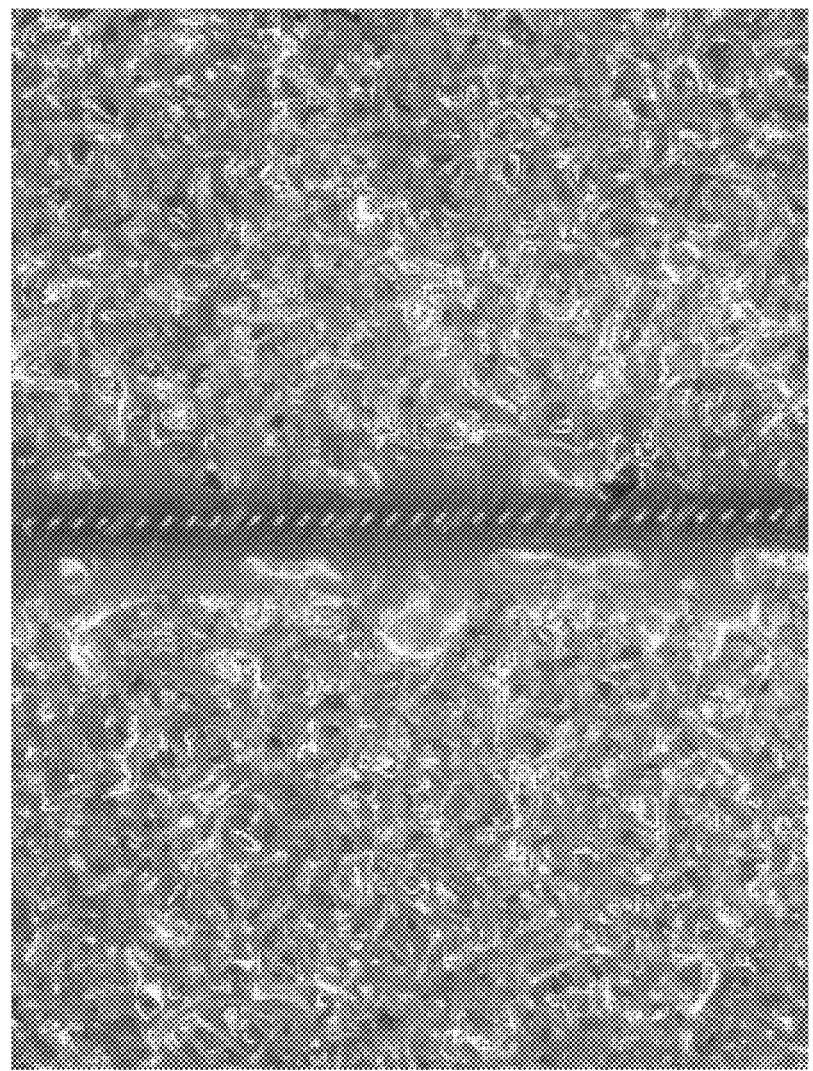
FIGS. 12A to 12C are drawings showing a surface appearance of the heater unit.
Figure 12B:
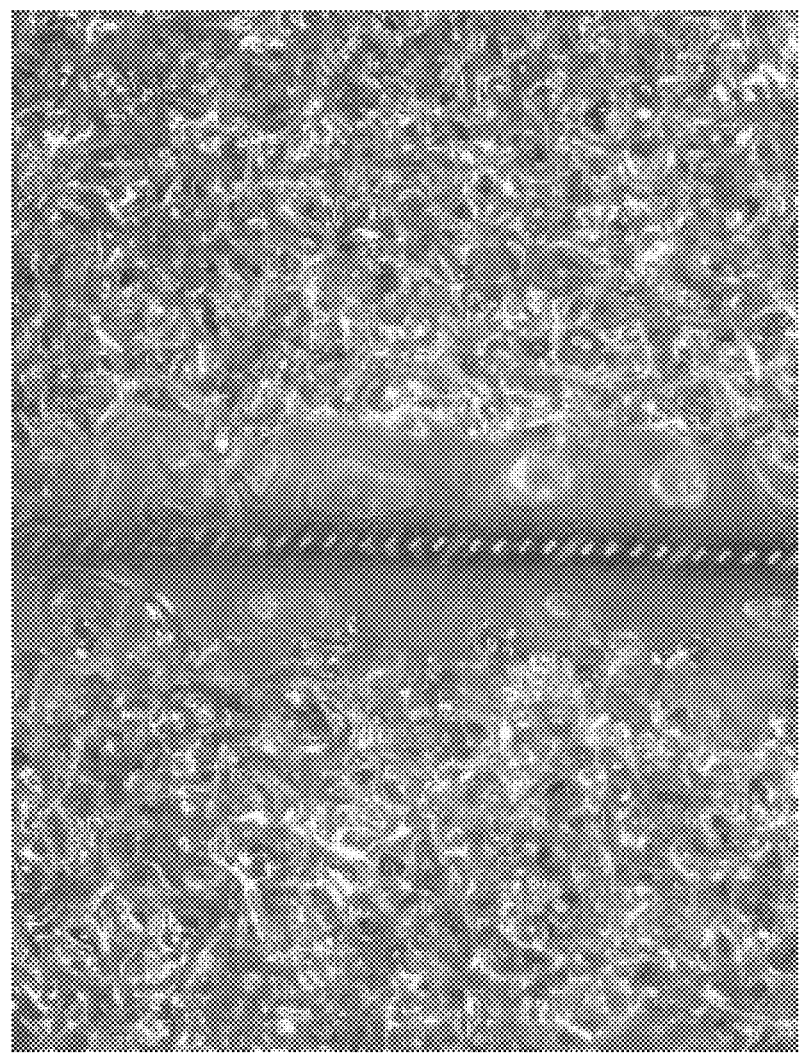
Figure 12C:
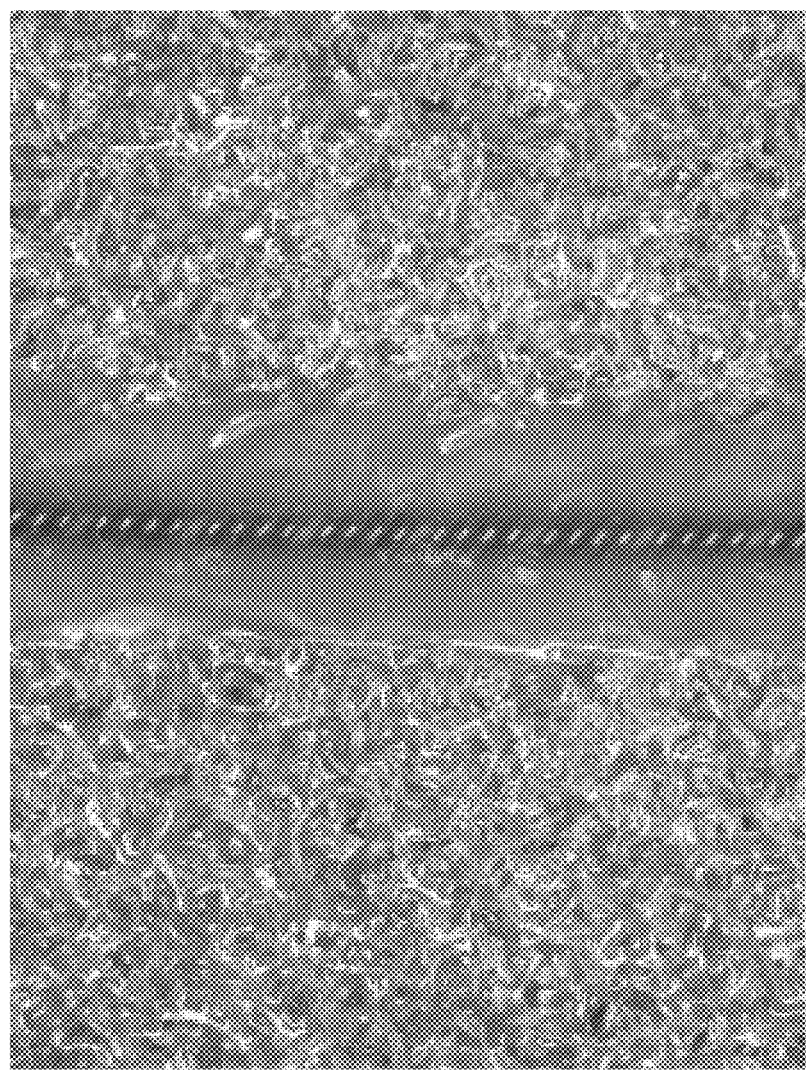

FIGS. 12A to 12C are drawings showing a surface appearance of the heater unit. FIG. 12A shows the fourth embodiment, FIG. 12B shows the fifth embodiment, and FIG. 12C shows the sixth embodiment.

Figure 13A:
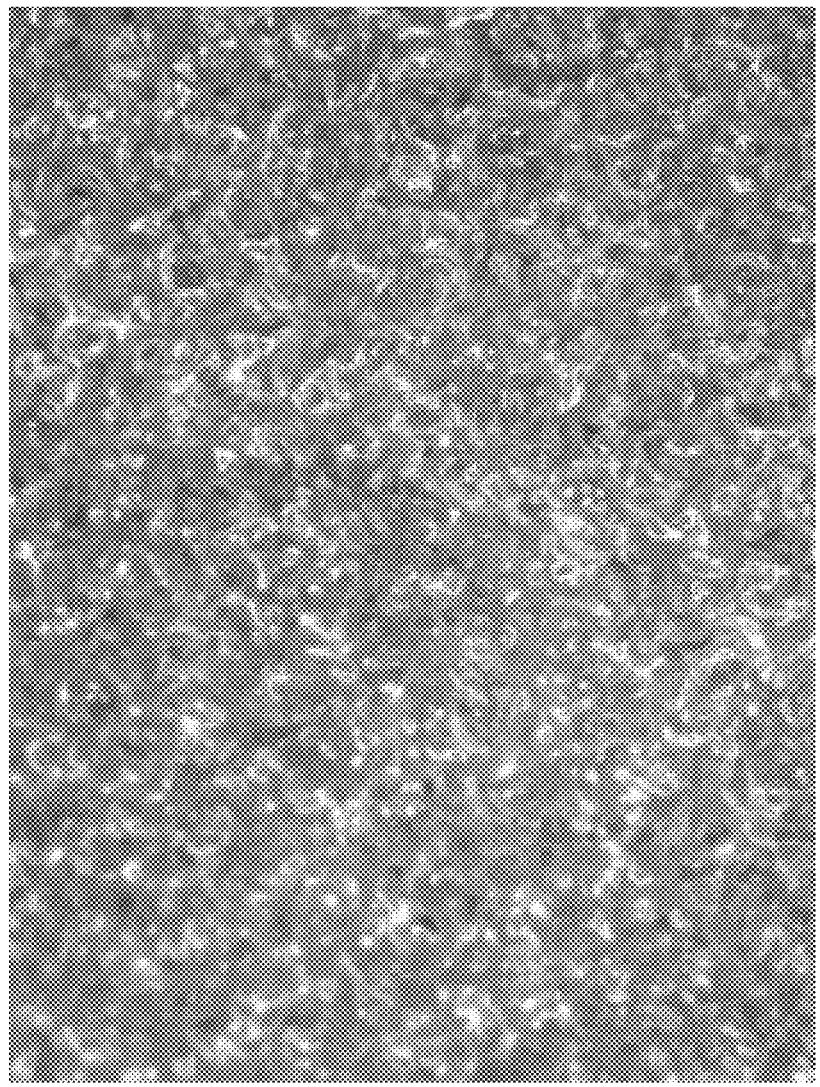
FIGS. 13A to 13C are drawings showing a reverse surface appearance of the heater unit.
Figure 13B:
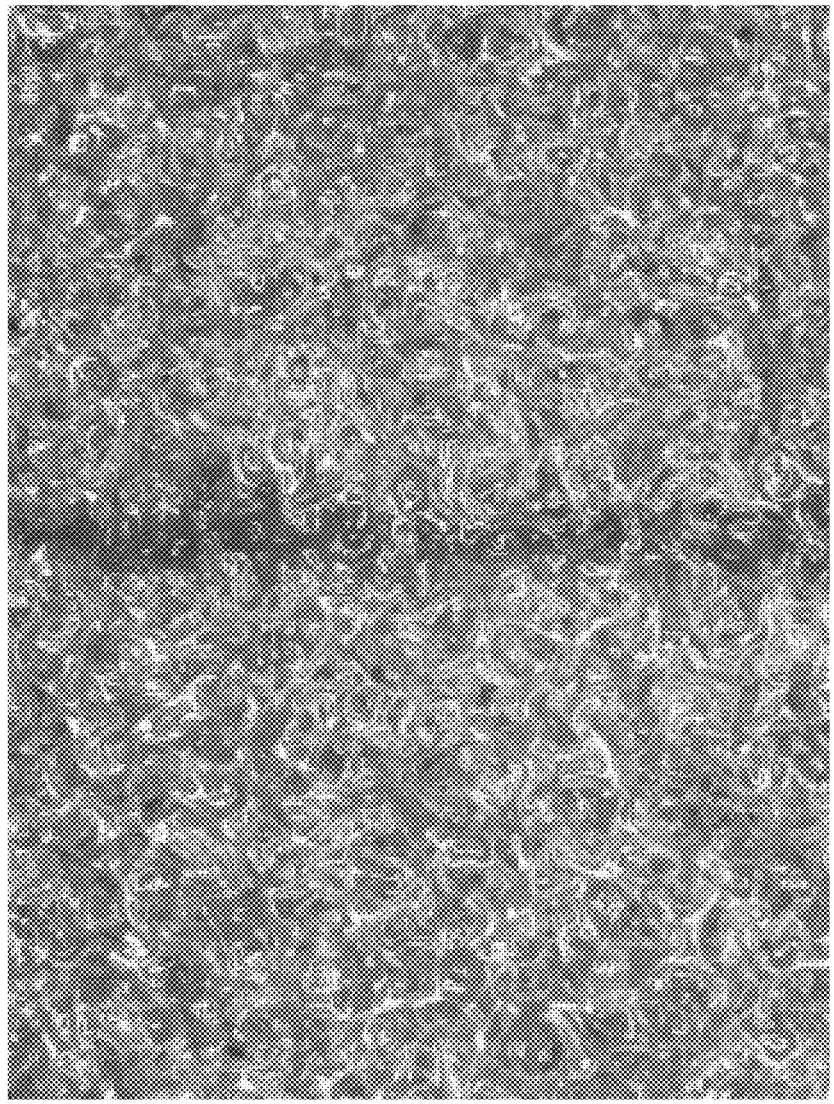
Figure 13C:
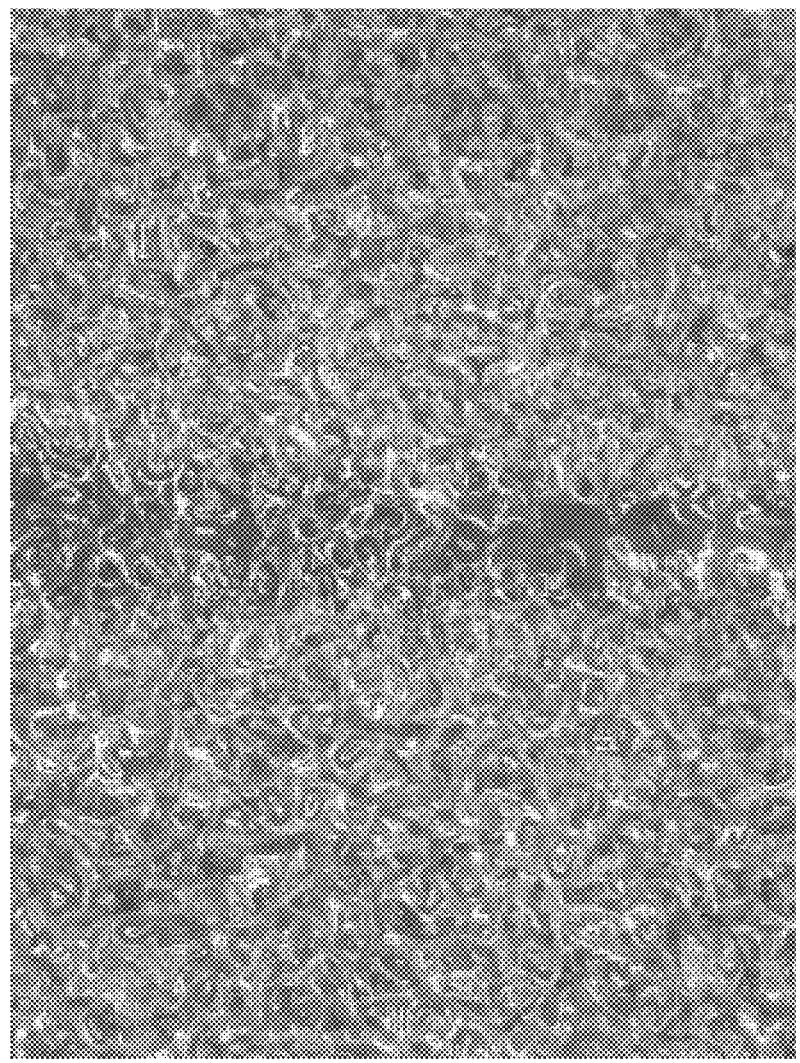

FIGS. 13A to 13C are drawings showing a reverse surface appearance of the heater unit. FIG. 13A shows the fourth embodiment, FIG. 13B shows the fifth embodiment, and FIG. 13C shows the sixth embodiment.

Figure 14A:
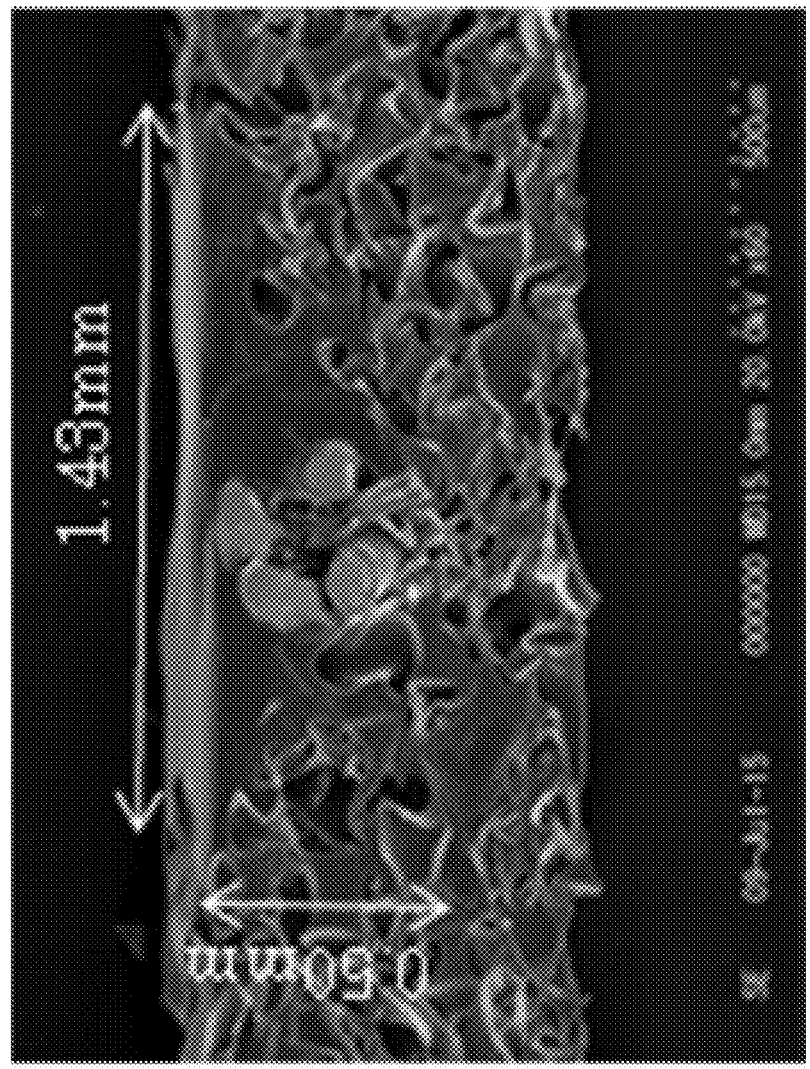
FIGS. 14A to 14C are SEM images of cross-sectional views of the heater unit.
Figure 14B:
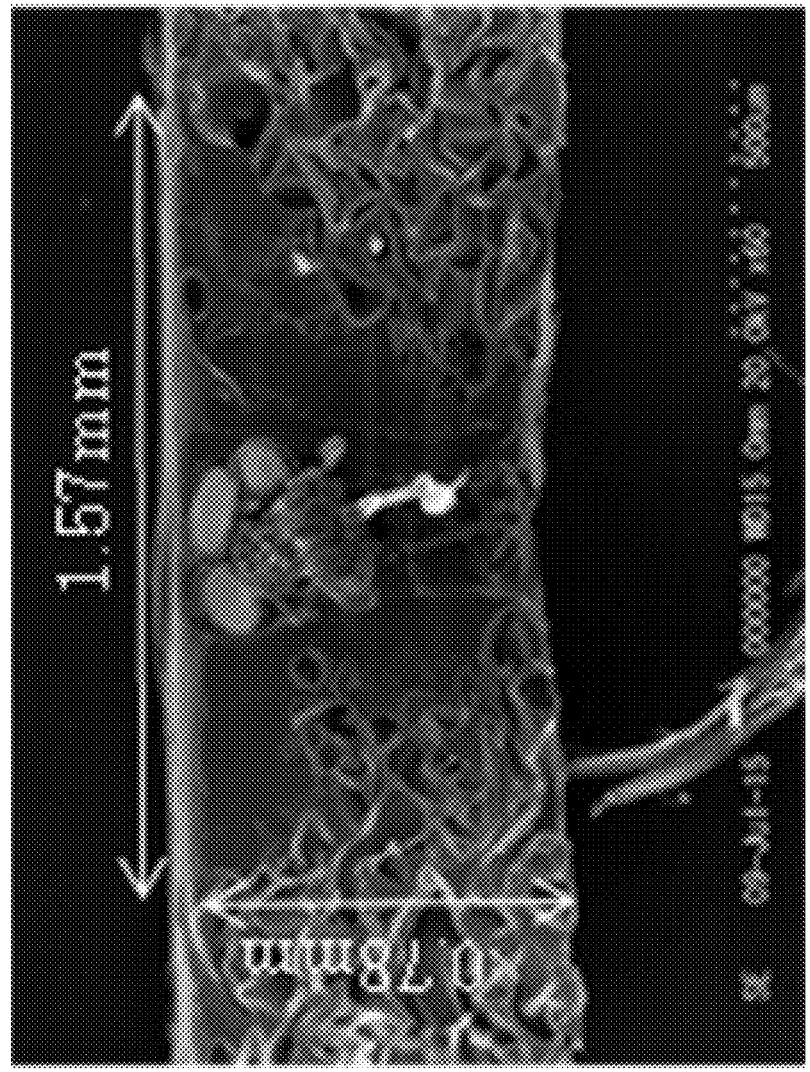
Figure 14C:
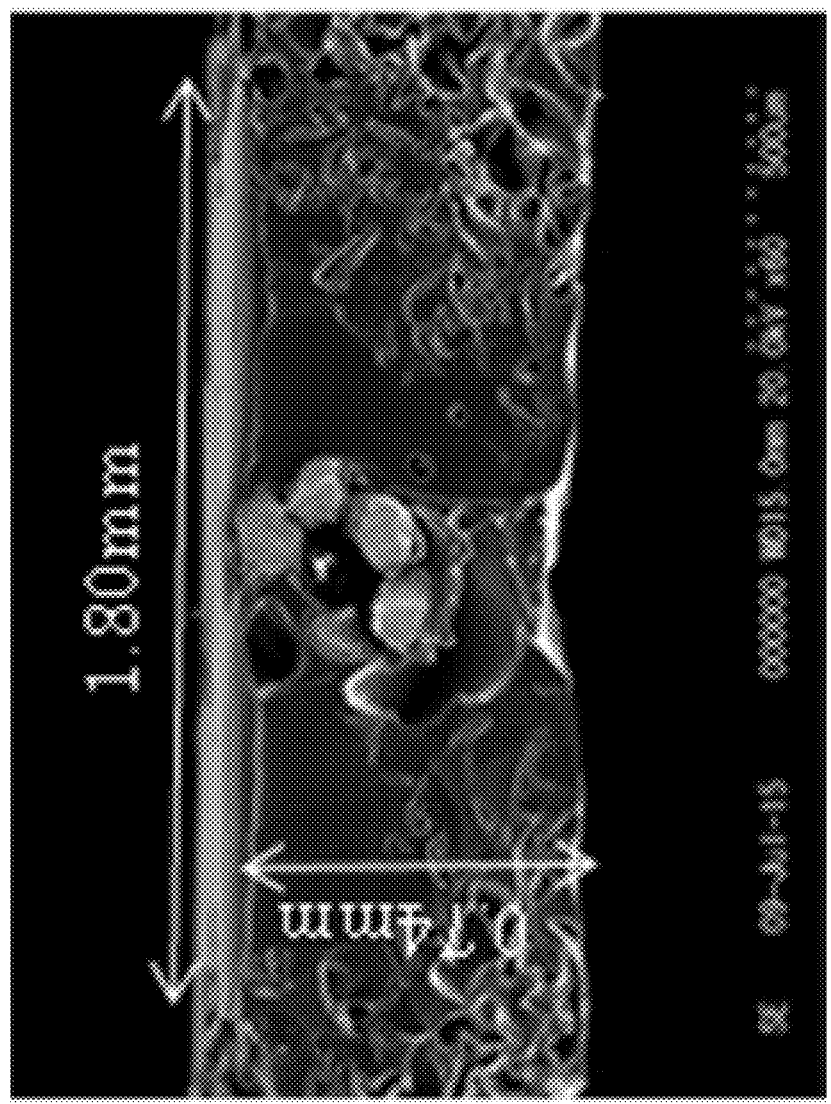

FIGS. 14A to 14C are SEM images of cross-sectional views of the heater unit. FIG. 14A shows the fourth embodiment, FIG. 14B shows the fifth embodiment, and FIG. 14C shows the sixth embodiment.

The heater unit of the fourth to sixth embodiments is formed by a cord-shaped heater and a substrate made of a polymeric foam. As described above, the cord-shaped heater is formed by using a heater core made of a bundle of an aromatic polyamide fiber having an outer diameter of approximately 0.19 mm and conductive wires made of tin-copper alloy wire having a strand diameter of 0.08 mm, paralleling seven conductive wires together, and spirally winding the paralleled conductive wires around an outer periphery of the heater core with a pitch of 1.00 mm. A thickness of the insulating film of the conductive wires is 0.005 mm. The state of spirally winding the conductive wires around the outer periphery of the heater core is referred to as a core material. A polyester-based resin compounded with a flame retardant as the heat-fusing portion 9 is extrusion-covered on an outer periphery of the core material.

A diameter of the core material is 0.37 mm in the forth to sixth embodiments. An outer diameter of the cord-shaped heater is 0.60 mm in the fourth embodiment, 0.77 mm in the fifth embodiment, and 0.97 mm in the sixth embodiment because the thickness (amount) of the heat-fusing portion 9 is different. A thickness of the heat-fusing portion is 0.115 mm in the fourth embodiment, 0.20 mm in the fifth embodiment, and 0.30 mm in the sixth embodiment.

In the heater unit, the heat-fusing portion 9 is formed on an outermost layer covering the core material of the heater. The cord-shaped heater is arranged on the substrate 10 and then thermally compressed. In the above process, the heat-fusing portion 9 of the cord-shaped heater is melted and permeated in the polymeric foam of the substrate 10. Thus, a fixed portion is formed. When the heat-fusing portion 9 is melted, a range impregnated in the substrate 10, which is the polymeric foam, varies depending on the thickness (amount) of the heat-fusing portion 9. The fixed portion is a portion where the heat-fusing portion of the cord-shaped heater is permeated into the polymeric foam of the substrate 10 and fixed, since the heat-fusing portion is melted and pressed to the substrate 10.

The heat-fusing portion 9 forms the fixed portion by being melted. The heat-fusing portion 9 does not have to keep an original shape. Since the cord-shaped heater is pressed to the substrate 10, the cord-shaped heater receives repulsive force from the substrate 10 before the cord-shaped heater is thermally compressed. When the heat-fusing portion 9 is thermally compressed, a part or the whole of the heat-fusing portion 9 is melted and liquefied. As a result, the melted heat-fusing portion 9 is considered to be permeated in pores of the polymeric foam from a portion contacted with the substrate 10. After the thermal compression is finished and the cord-shaped heater is cooled, the heat-fusing portion 9 is permeated into the substrate 10 in a width direction and a thickness direction of the substrate 10. The heat-fusing portion 9 is combined with the substrate 10, which is the polymeric foam, at an outermost layer. Since the combined portion is formed, the cord-shaped heater is considered to be strongly adhered with the substrate 10.

In addition, the cord-shaped heater is inside the fixed portion, and the fixed portion is gotten into the substrate 10. A thickness of a portion on which the cord-shaped heater is arranged does not exceed a thickness of the substrate 10 on which the cord-shaped heater is not arranged. Although the thickness of the portion on which the cord-shaped heater is arranged does not exceed the thickness of the substrate 10 on which the cord-shaped heater is not arranged in the present embodiment, the portion on which the cord-shaped heater is arranged can be slightly thicker than the substrate 10 on which the cord-shaped heater is not arranged. Even if the thickness is slightly thicker, it is included in the present invention as long as the user does not feel uncomfortable when operating the steering wheel. In another point of view, the user may not feel uncomfortable even if the thickness is thicker than the substrate 10 or thinner than the substrate 10 depending on the hardness of the fixed portion containing the cord-shaped heater.

A thickness (KA) of the substrate 10, a diameter (KB) of the core material (core+wire), a width (KC) of the heat-fusing portion (fixed portion) permeated into the substrate, and a depth (KID) of the heat-fusing portion (fixed portion) permeated into the substrate are shown in the following table.

|      | Fourth embodiment | Fifth embodiment | Sixth embodiment |
|------|-------------------|------------------|------------------|
| (KA) | 0.80              | 0.78             | 0.74             |
| (KB) | 0.37              | 0.37             | 0.37             |
| (KC) | 1.43              | 1.57             | 1.80             |
| (KD) | 0.50              | 0.78             | 0.74             |

In order to clarify the permeated state of the heat-fusing portion permeated into the substrate, a ratio (KD/KA) between the thickness of the fixed portion and the thickness of the substrate, a ratio (KC/KB) between the width of the fixed portion and width of the core material, and a ratio (D/B) between the thickness of the fixed portion and width of the core material are calculated and shown below.

|         | Fourth embodiment | Fifth embodiment | Sixth embodiment |
|---------|-------------------|------------------|------------------|
| (KD/KA) | 63%               | 100%             | 100%             |
| (KC/KB) | 386%              | 424%             | 486%             |

-continued

|  | Fourth embodiment | Fifth embodiment | Sixth embodiment |
|---|---|---|---|
| (KD/KB) | 135% | 211% | 200% |

The heater unit of the present invention is comprised of: a substrate made of a polymeric foam; and a cord-shaped heater arranged on the substrate, wherein a heat-fusing portion is formed on an outermost layer covering the core material of the heater, and the heat-fusing portion of the cord-shaped heater is melted and permeated into the polymeric foam to form a fixed portion.

In addition, a method of manufacturing the heater unit is characterized in that the heat-fusing portion of the cord-shaped heater is melted and permeated into the polymeric foam to form a fixed portion.

Furthermore, the heater unit and the method above have following features.

From the fourth embodiment, the thickness of the fixed portion exceeds 60% of the thickness of the substrate.

From the fifth and sixth embodiments, the thickness of the fixed portion is approximately same as the thickness of whole the substrate.

From the fourth embodiment, the width of the fixed portion exceeds three times of the width of the core material.

From the fifth and sixth embodiments, the width of the fixed portion does not exceed five times of the width of the core material.

From the fourth embodiment, the thickness of the fixed portion exceeds 1.3 times of the width of the core material.

From the fifth embodiment, the thickness of the fixed portion does not exceed 2.5 times of the width of the core material.

Of course, the above values are merely an example of the embodiment. Considering a general and reasonable expectation by a person skilled in the art, same result can be expected in a range within 50% of the lower limit value to 200% of the upper limit value. Preferably, a better result can be expected in a range within 75% of the lower limit value to 150% of the upper limit value. More preferably, a better result can be expected in a range within 90% of the lower limit value to 110% of the upper limit value.

The inventors considered as follows.

At the present moment, the thickness of the heat-fusing portion is minimally 0.115 mm as a practically applicable size.

Adhesive strength increases as the heat-fusing portion is permeated deeper. In case the heat-fusing portion reaches the reverse side of the substrate (KD/KA=100%), the portion reached to the reverse side may appear on the surface of the steering wheel as foreign matter.

Since the width and depth of the fixed portion are specified so that the core material (core and wire) can be surely fixed to the substrate, the width and depth of the fixed portion should be compared with the diameter of the core material (core and wire). Although the wire is laterally wound around the heater core in the product of the present embodiment, the product can be also achieved only by twisting a plurality of wires without using the heater core.

Adhesive strength increases as the width of the fixed portion is wider. However, if the width is too wide, it may cause discomfort. In this regard, the range of approximately 300%≤KC/KB≤500% is considered to be adequate.

As for the depth of the fixed portion with respect to the core material (core+wire) should be KD/KB>100% so that the fixed portion does not protrude from the substrate. However, if the depth is too deep, it may cause discomfort. Therefore, the range approximately KD/KB≤250% is considered to be adequate.

As for the manufacturing method, which compresses polyurethane having an apparent density of 0.04 g/cm$^3$ to 0.8 mm, of the fourth and fifth embodiments is as follows.

Conditions of Thermal Compression
  hot press plate 27: 215° C.±10° C.
  hot pressing jig 15: 230° C.±10° C.
  descent pressure, first time: 0.3 MPa, second time 0.5 to 1.0 MPa
  compression time: 25±2 seconds The condition of thermal compression may differ according to the configuration of the product. For example, the condition differs when other types of material is used for the substrate and the heat-fusing portion, when the substrate having different apparent density and porosity is used, and when the thickness after the compression is changed.

In addition, the same product may be obtained even if the conditions other than the above are used. For example, the same product may be obtained by decreasing the temperature and increasing the compression time.

Note that the present invention is not limited to the above described embodiments.

Figure 4:
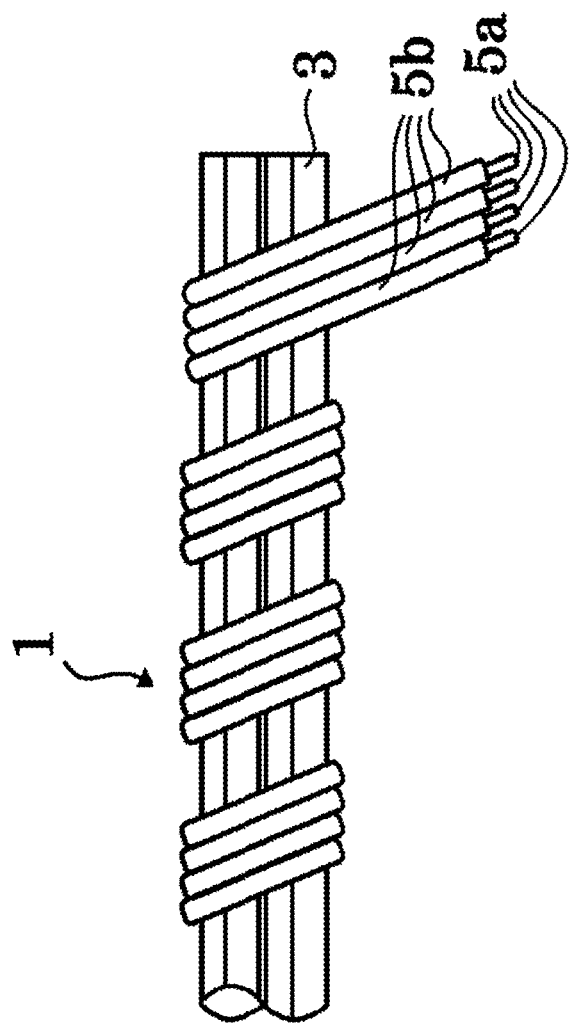
FIG. 4 is a side view showing a configuration of a cord-shaped heater used in the present invention by partly cutting the cord-shaped heater.

Any conventionally known cord-shaped heaters can be used as the cord-shaped heater 1. For example, a cord-shaped heater shown in Japanese Patent No. 4202071 can be used. This cord-shaped heater is formed by winding a heat generator in which heat generating wires are paralleled around an outer periphery of a heater core, and forming an insulation layer made of an FEP and optionally a heat-fusing layer made of a polyethylene. In addition, a cord-shaped heater shown in Japanese Patent Application Publication No. 2007-158452 can be used. In this cord-shaped heater, the heater core 3 has heat shrinking property and heat-melting property. In addition, a cord-shaped heater shown in Japanese Patent Application Publication No. 2007-158453 can be used. This cord-shaped heater is formed by paralleling conductive wires in which a heat generator is covered by an insulating film. In addition, a cord-shaped heater shown in Japanese Patent Application Publication No. 2007-134341 can be used. In this cord-shaped heater, a heat generator is formed by silver containing copper alloy wire in which copper solid solution and copper silver eutectic alloy are in a fibrous state. A configuration shown in FIG. 4 can be also considered. Specifically, the cord-shaped heater 1 is formed by using a heater core 3 made of a bundle of an aromatic polyamide fiber having an outer diameter of approximately 0.2 mm and conductive wires 5a made of tin-copper alloy wire having a strand diameter of 0.08 mm, paralleling seven conductive wires 5a together, and spirally winding the paralleled conductive wires around an outer periphery of the heater core 3 with a pitch of 1.00 mm Note that the conductive wires 5a are covered by the insulating film 5b made of polyurethane with a thickness of approximately 0.005 mm. The cord-shaped heater 1 has above described configuration. A finishing outer diameter of the cord-shaped heater 1 is 0.38 mm.

The substrate 10 is not limited to the foamed polyurethane resin. For example, various polymeric foams such as a foamed resin sheet made of other materials and a foamed rubber sheet can be used. Materials having excellent stretchability are particularly preferred. It is preferred that hardness is adjusted so that unevenness of the cord-shaped heater does not appear on the surface. In order to adjust the hardness, various methods can be used. For example, a foaming rate can be adjusted, pores can be closed cells and open cells, or hardness of the material can be selected according to the purpose. The materials can be selected from various resins, rubbers and thermoplastic elastomers such as a polyurethane resin, a chloroprene rubber, a silicone resin, a silicone rubber, a neoprene rubber, a diene rubber, a nitrile rubber, a natural rubber, a polyethylene resin, a polypropylene resin, and an ethylene-vinyl acetate copolymer. A plurality of substrates 10 can be used. The plurality of substrates 10 can be laminated in layers. In this case, different kinds of materials can be used each for the plurality of substrates 10. Because of this, unevenness of the cord-shaped heater hardly appears to the surface. It is preferred that the adhesive layer is formed so that the adhesive material is not entered in the pores and other portions inside the substrate 10. By doing so, curing of the substrate 10 is prevented and stretchability can be maintained. In addition, touch feeling can be maintained.

When arranging the cord-shaped heater 1 on the substrate 10, the cord-shaped heater 1 can be fixed on the substrate 10 by using various methods other than the fusion of the thermal compression. For example, the cord-shaped heater 1 can be fixed on the substrate 10 by sewing. When thermally compressing the substrate 10, the hot pressing jig 15 can be also heated in addition to the hot press plate 27. At this time, if the temperature is specified to be different between the hot press plate 27 and the hot pressing jig 15, compression ratio of the substrate 10 can be changed in order to change porosity.

Various materials can be used as the adhesive layer. For example, an adhesive layer made of polymer acrylic adhesive and not using a tape substrate, or an adhesive layer having adhesive material on both sides of polypropylene film. The material having flame retardancy satisfying by itself the requirements of the combustion test of the automobile interior material of FMVSS No. 302 is preferred because the flame retardancy of the heater unit is improved. The adhesive layer is preferred to be formed only of the adhesive material so as to maintain the stretchability of the heater unit The present invention can provide the steering wheel that does not give discomfort to a user when operating the steering wheel. The heater unit of the present invention is used, for example, for a steering wheel of an automobile, a boat, various transport vehicles, various farming vehicles, and various heavy equipment for engineering and construction. In particular, the heater unit is suitably used for warming the wheel portion of the steering wheel. Since the cord-shaped heater of the heater unit of the present invention is flat without forming unevenness, the heater unit can be applied to other than the steering wheel. For example, the cord-shaped heater can be applied to an electric blanket, an electric carpet, a car sheet heater, a steering heater, a toilet seat heater, a heater for antifogging mirror, a heating cooker, a heater for floor heating and a heater for clothing.

Note that, this invention is not limited to the above-mentioned embodiments. Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

While the invention has been particularly shown and described with respect to preferred embodiments thereof, it should be understood by those skilled in the art that the foregoing and other changes in form and detail may be made therein without departing from the sprit and scope of the invention as defined in the appended claims.

What is claimed is:

1. A heater unit, comprising:
a substrate made of a polymeric foam; and
a cord-shaped heater arranged on the substrate, wherein
a thickness of the substrate is thinner at a portion on which the cord-shaped heater is arranged than other area so that the portion is formed along a shape of the cord-shaped heater and the heater unit is approximately flat,
a heat-fusing portion is formed on an outermost layer of the cord-shaped heater, and
the heat-fusing portion of the cord-shaped heater is melted and permeated in the polymeric foam to form a fixed portion.

2. The heater unit according to claim 1, wherein
the thickness of the substrate is approximately constant at the portion on which the cord-shaped heater is arranged.

3. The heater unit according to claim 1, wherein
the thickness of the fixed portion exceeds 60% of the thickness of the substrate.

4. The heater unit according to claim 1, wherein
the thickness of the fixed portion is approximately same as the thickness of the substrate.

5. The heater unit according to claim 1, wherein
the width of the fixed portion exceeds three times of the width of a core material.

6. The heater unit according to claim 5, wherein
the width of the fixed portion does not exceed five times of the width of the core material.

7. The heater unit according to claim 1, wherein
the thickness of the fixed portion exceeds 1.3 times of the width of the core material.

8. The heater unit according to claim 7, wherein
the thickness of the fixed portion does not exceed 2.5 times of the width of the) core material.

9. The heater unit according to claim 1, wherein
nothing other than the cord-shaped heater is arranged on the substrate at a surface on which the cord-shaped heater is arranged.

10. The heater unit according to claim 1, wherein
the substrate is formed by laminating a plurality of formed bodies having different porosity, and
the porosity is higher at the foamed body on which the cord-shaped heater is arranged than the porosity of the other foamed bodies.

11. A steering wheel, comprising:
the heater unit according to claim 1;
a wheel core material; and
a covering material, wherein
the heater unit is arranged between the wheel core material and the covering material.

12. A method of manufacturing a heater unit,
the heater unit comprising:
a substrate made of a polymeric foam,
a cord-shaped heater, and a heat-fusing portion is formed on an outermost layer of the cord-shaped heater, the method comprising the steps of:
arranging the cord-shaped heater on the substrate in a predetermined pattern shape; and
thermally compressing the substrate by a flat plate, wherein a thickness of the substrate is thinner at a portion on which the cord-shaped heater is arranged than other area so that the portion is formed along a shape of the cord-shaped heater and the heater unit is approximately flat, and the heat-fusing portion of the cord-shaped heater is melted and permeated in the polymeric foam to form a fixed portion.

* * * * *